United States Patent
Anwar et al.

(10) Patent No.: US 11,336,924 B2
(45) Date of Patent: *May 17, 2022

(54) POINT OF VIEW MULTIMEDIA PROVISION

(71) Applicant: FieldCast, LLC, Spokane, WA (US)

(72) Inventors: Saeed Z. Anwar, Spokane, WA (US); Tenzing P. Tshering, New York, NY (US)

(73) Assignee: FieldCast, LLC, Spokane, WA (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/939,003

(22) Filed: Jul. 26, 2020

(65) Prior Publication Data
US 2020/0359058 A1    Nov. 12, 2020

Related U.S. Application Data

(60) Continuation of application No. 16/299,123, filed on Mar. 11, 2019, now Pat. No. 10,728,584, which is a
(Continued)

(51) Int. Cl.
*H04N 21/218* (2011.01)
*H04N 21/2187* (2011.01)
(Continued)

(52) U.S. Cl.
CPC ....... *H04N 21/21805* (2013.01); *H04N 7/181* (2013.01); *H04N 21/2187* (2013.01);
(Continued)

(58) Field of Classification Search
CPC ......... H04N 21/21805; H04N 21/2187; H04N 7/181; H04N 1/00209; H04N 5/247;
(Continued)

(56) References Cited

U.S. PATENT DOCUMENTS

| 4,102,564 A | 7/1978 | Michael |
| 6,819,354 B1 | 11/2004 | Foster et al. |

(Continued)

FOREIGN PATENT DOCUMENTS

| CA | 2549772 A1 | 10/2007 |
| EP | 2884751 A1 | 6/2015 |

OTHER PUBLICATIONS

U.S. Non-Final Office Action dated Nov. 12, 2020 cited in U.S. Appl. No. 16/847,241, 28 pgs.
(Continued)

*Primary Examiner* — Kashif Siddiqui
(74) *Attorney, Agent, or Firm* — Bekiares Eliezer LLP

(57) ABSTRACT

A point of view multimedia provision may be provided. Embodiments of the provision may enable entities to integrate detection devices within a venue for data capture. The provision may further enable entities to implement access points to receive and transmit captured data from the detection devices. Users of the provision may use embodiments to ingest, analyze and process the data according to certain rules. Subsequently, the processed data may be combined into point-of-view content provided to end users. End users may use embodiments of the provision to request specific point of view content, receive such requested content, manipulate the content and provide feedback based on the provided content.

15 Claims, 6 Drawing Sheets

Related U.S. Application Data division of application No. 14/612,671, filed on Feb. 3, 2015, now Pat. No. 10,230,995, which is a continuation of application No. 14/565,915, filed on Dec. 10, 2014, now Pat. No. 9,918,110.

(60) Provisional application No. 62/059,378, filed on Oct. 3, 2014, provisional application No. 62/026,475, filed on Jul. 18, 2014, provisional application No. 61/935,982, filed on Feb. 5, 2014, provisional application No. 61/915,783, filed on Dec. 13, 2013.

(51) Int. Cl.
*H04N 21/234* (2011.01)
*H04N 21/2343* (2011.01)
*H04N 21/235* (2011.01)
*H04N 21/81* (2011.01)
*H04N 7/18* (2006.01)
*H04N 21/472* (2011.01)
*H04N 21/4728* (2011.01)
*H04N 21/6437* (2011.01)

(52) U.S. Cl.
CPC ... *H04N 21/2353* (2013.01); *H04N 21/23418* (2013.01); *H04N 21/234309* (2013.01); *H04N 21/4728* (2013.01); *H04N 21/47202* (2013.01); *H04N 21/8146* (2013.01); *H04N 21/6437* (2013.01)

(58) Field of Classification Search
CPC ............. H04N 19/44; H04N 21/23418; H04N 21/234309; H04N 21/2353; H04N 21/4307; H04N 21/47202; H04N 21/4728; H04N 21/6437; H04N 21/8146; H04N 21/84; H04N 21/8455; H04N 5/2253; H04N 5/23238; H04N 5/23241; A42B 3/0433; A42B 3/042; G06K 9/00718; G06K 9/00744; G11B 27/005; G11B 27/036; G11B 27/10
See application file for complete search history.

(56) References Cited

U.S. PATENT DOCUMENTS

| | | | |
|---|---|---|---|
| 7,884,855 B2 | 2/2011 | Ortiz | |
| 8,184,169 B2 | 5/2012 | Ortiz | |
| 8,319,845 B2 | 11/2012 | Ortiz | |
| 8,504,061 B2 | 8/2013 | Grainger et al. | |
| 8,548,768 B2 | 10/2013 | Greenwald et al. | |
| 8,854,457 B2 | 10/2014 | De Vleeschouwer et al. | |
| 9,247,779 B1 | 2/2016 | Aloumanis et al. | |
| 9,266,017 B1 | 2/2016 | Parker et al. | |
| 9,389,677 B2 | 7/2016 | Hobby et al. | |
| 9,686,466 B1 | 6/2017 | Billinghurst et al. | |
| 9,782,660 B2 | 10/2017 | Tawiah | |
| 9,918,110 B2 | 3/2018 | Anwar et al. | |
| 9,998,615 B2 | 6/2018 | Anwar et al. | |
| 10,230,995 B2 * | 3/2019 | Anwar | H04N 21/47202 |
| 10,375,424 B2 | 8/2019 | Anwar et al. | |
| 10,622,020 B2 | 4/2020 | Anwar et al. | |
| 10,728,584 B2 * | 7/2020 | Anwar | H04N 21/2353 |
| 2005/0177853 A1 * | 8/2005 | Williams | H04N 21/2181 725/81 |
| 2006/0128397 A1 * | 6/2006 | Choti | G06Q 30/0205 455/456.1 |
| 2007/0204302 A1 * | 8/2007 | Calzone | H04N 7/17318 725/46 |
| 2008/0109729 A1 | 5/2008 | Notea et al. | |
| 2009/0022172 A1 | 1/2009 | Haberman et al. | |
| 2010/0304931 A1 * | 12/2010 | Stumpf | A63B 22/02 482/4 |
| 2011/0013087 A1 | 1/2011 | House et al. | |
| 2011/0205022 A1 | 8/2011 | Cavallaro et al. | |
| 2012/0108304 A1 | 5/2012 | Horie et al. | |
| 2012/0236544 A1 | 9/2012 | Dorman | |
| 2012/0304071 A1 * | 11/2012 | Hughes | G07F 17/3288 715/738 |
| 2013/0070047 A1 * | 3/2013 | Digiovanni | H04N 21/234345 348/36 |
| 2013/0080531 A1 | 3/2013 | Yoon et al. | |
| 2013/0150684 A1 | 6/2013 | Cooner | |
| 2013/0162781 A1 | 6/2013 | Hubner et al. | |
| 2013/0178259 A1 | 7/2013 | Strause et al. | |
| 2013/0182116 A1 * | 7/2013 | Arima | H04N 21/478 348/157 |
| 2013/0182119 A1 | 7/2013 | Eledath et al. | |
| 2013/0215281 A1 | 8/2013 | Hobby et al. | |
| 2013/0286959 A1 | 10/2013 | Lou et al. | |
| 2013/0303248 A1 * | 11/2013 | Williams | H04N 21/8547 463/6 |
| 2014/0081428 A1 | 3/2014 | Rudberg et al. | |
| 2014/0181272 A1 | 6/2014 | Abrams | |
| 2014/0267747 A1 | 9/2014 | Kritt et al. | |
| 2014/0294366 A1 | 10/2014 | Fletchall | |
| 2014/0304891 A1 | 10/2014 | Waters | |
| 2014/0343984 A1 | 11/2014 | Shahabi et al. | |
| 2015/0046407 A1 | 2/2015 | Kalas et al. | |
| 2015/0066625 A1 | 3/2015 | McDonald et al. | |
| 2015/0067754 A1 | 3/2015 | Wiser et al. | |
| 2015/0074259 A1 | 3/2015 | Ansari et al. | |
| 2015/0085133 A1 | 3/2015 | Teich et al. | |
| 2015/0105159 A1 | 4/2015 | Palotas | |
| 2015/0145990 A1 | 5/2015 | Jones | |
| 2015/0149407 A1 | 5/2015 | Abbott et al. | |
| 2015/0172605 A1 | 6/2015 | Anwar et al. | |
| 2015/0177597 A1 | 6/2015 | Harrison et al. | |
| 2015/0189176 A1 | 7/2015 | Pacurariu et al. | |
| 2015/0222934 A1 | 8/2015 | Anwar et al. | |
| 2015/0254882 A1 | 9/2015 | Englert et al. | |
| 2016/0015109 A1 | 1/2016 | Anwar et al. | |
| 2016/0099025 A1 | 4/2016 | Anwar et al. | |
| 2017/0011598 A1 | 1/2017 | Strause et al. | |
| 2017/0232351 A1 | 8/2017 | Thompson | |
| 2018/0176608 A1 | 6/2018 | Anwar et al. | |
| 2018/0176661 A1 | 6/2018 | Varndell et al. | |
| 2018/0270368 A1 | 9/2018 | Anwar et al. | |
| 2019/0208232 A1 | 7/2019 | Anwar et al. | |
| 2020/0349977 A1 | 11/2020 | Anwar et al. | |

OTHER PUBLICATIONS

European Search Report dated Feb. 27, 2015 cited in 14197499.8, 9 pgs.
U.S. Non-Final Office Action dated Jan. 30, 2017 cited in U.S. Appl. No. 14/801,613, 21 pgs.
U.S. Non-Final Office Action dated Jun. 14, 2017 cited in U.S. Appl. No. 14/565,915, 9 pgs.
U.S. Final Office Action dated Oct. 4, 2017 cited in U.S. Appl. No. 14/801,613, 27 pgs.
U.S. Non-Final Office Action dated Jul. 26, 2018 cited in U.S. Appl. No. 14/870,101, 13 pgs.
U.S. Non-Final Office Action dated Aug. 24, 2018 cited in U.S. Appl. No. 15/988,056, 20 pgs.
U.S. Non-Final Office Action dated Oct. 19, 2018 cited in U.S. Appl. No. 15/883,972, 12 pgs.
U.S. Non-Final Office Action dated Oct. 26, 2018 cited in U.S. Appl. No. 14/870,101, 16 pgs.
U.S. Final Office Action dated Feb. 28, 2019 cited in U.S. Appl. No. 15/988,056, 21 pgs.
U.S. Final Office Action dated Sep. 6, 2019 cited in U.S. Appl. No. 14/870,101, 13 pgs.
U.S. Non-Final Office Action dated Sep. 25, 2019 cited in U.S. Appl. No. 15/988,056, 21 pgs.
Copending U.S. Appl. No. 16/847,241, filed Apr. 13, 2020 entitled "Point of View Video Processing and Curation Platform".

* cited by examiner

POINT OF VIEW MULTIMEDIA PROVISION

RELATED APPLICATION

This application is a continuation of U.S. application Ser. No. 16/299,123 filed Mar. 11, 2019, which issues on Jul. 28, 2020 as U.S. Pat. No. 10,728,584, which is a division of U.S. application Ser. No. 14/612,671 filed Feb. 3, 2015, which issued on Mar. 12, 2019 as U.S. Pat. No. 10,230,995, which is a continuation of U.S. application Ser. No. 14/565,915 filed Dec. 10, 2014, which issued on Mar. 13, 2018 as U.S. Pat. No. 9,918,110, which claims priority to U.S. Provisional Application No. 62/059,378 filed Oct. 3, 2014, which claims priority to U.S. Provisional Application No. 62/026,475 filed Jul. 18, 2014, which claims priority to U.S. Provisional Application No. 61/935,982 filed Feb. 5, 2014, which claims priority to U.S. Provisional Application No. 61/915,783 filed Dec. 13, 2013, which are hereby incorporated by reference herein in its entirety.

This application further relates to U.S. application Ser. No. 16/847,241, filed Apr. 13, 2020, the disclosure of which is hereby incorporated by reference herein in its entirety.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to content capture, processing, delivery, and monetization in a networked environment.

BACKGROUND

The current state-of-the-art of video and audio capture, processing, and delivery may involve, for example, multiple capturing cameras and microphones throughout a venue. In the typical setup, each venue camera may be associated with a broadcast feed that can be selected for transmission to entities within the venue or entities in remote proximity to the venue.

BRIEF OVERVIEW

A point of view multimedia provision may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

A point of view multimedia provision may be provided. Embodiments of the provision may enable entities to integrate detection devices within a venue for data capture. The provision may further enable entities to implement access points to receive and transmit captured data from the detection devices. Users of the provision may use embodiments to ingest, analyze and process the data according to certain rules. Subsequently, the processed data may be combined into point-of-view content provided to end users. End users may use embodiments of the provision to request specific point of view content, receive such requested content, manipulate the content and provide feedback based on the provided content.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
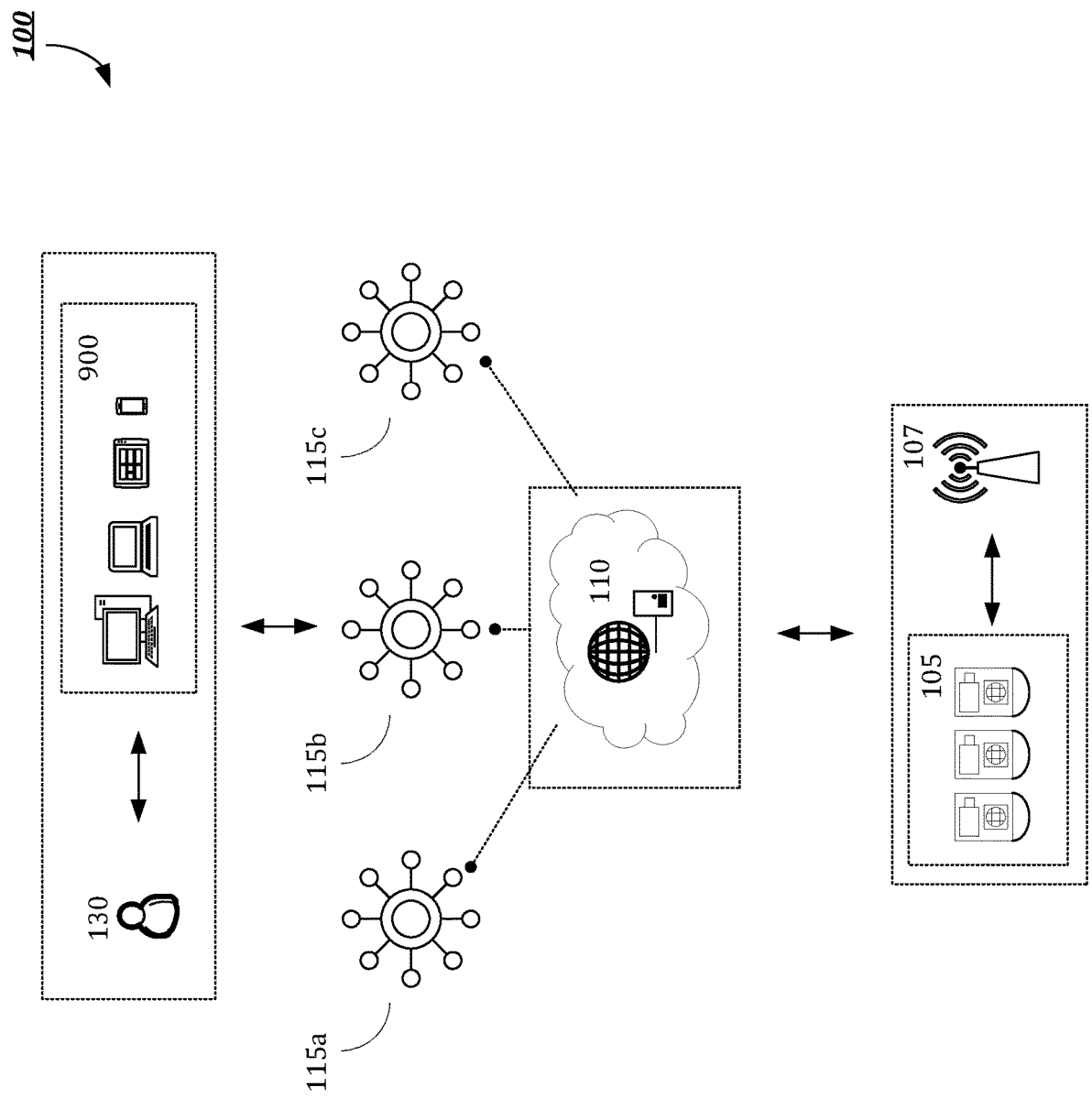
FIG. 1 illustrates an operating environment for providing a Point of View (POV) multimedia platform.

The following detailed description refers to the accompanying drawings.

Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

I. PLATFORM OVERVIEW

Consistent with embodiments of the present disclosure, a point of view multimedia provision may be provided. This overview is provided to introduce a selection of concepts in a simplified form that are further described below. This overview is not intended to identify key features or essential features of the claimed subject matter. Nor is this overview intended to be used to limit the claimed subject matter's scope. The point of view multimedia provision may be used by individuals or companies to enable users to control feed from a broadcast.

In conventional systems, the selection of a broadcast feed to stream may be in the manual control of an operator within a venue. In turn, the operator's selection of the broadcast stream may cause the single, selected broadcast feed to be provided to audiences. Conventional systems do not provide audiences with control over the selection of different views that are available in the venue. Rather, the operator remains in control of the broadcast selection process. In turn, conventional systems limit audiences (within the venue and remote to the venue) to viewing content that is exclusively within an operator's control.

Embodiments of the present invention may provide a multimedia platform addressing this problem, as well as other problems found in conventional systems. The platform may enable audiences to select various points of views within the venue for streaming. Furthermore, the platform may be operative with remote audiences, enabling venue selection in addition to the accessibility to various points of view within a selected venue.

II. PLATFORM OPERATING ENVIRONMENT

Related U.S. patent application Ser. No. 14/565,915, entitled "Point of View Multimedia Platform," filed by the current applicant, (hereinafter the '915 disclosure), details a Point of View Multimedia Platform that is incorporated, in its entirety, into the present disclosure. The present application details systems and methods that may employ the technology detailed in the '915 disclosure.

FIG. 1 illustrates one possible operating environment through which a platform consistent with embodiments of the present disclosure may be provided. By way of non-limiting example, a platform 100 may be hosted on centralized servers, such as, for example, a cloud computing service or data center 110. A user 130 may access platform 100 through a software application. One possible embodiment of the software application may be provided by the Sport of View™ suite of products and services provided by FieldCast, LLC.

The software application may be embodied as, for example, but not be limited to, a website, a web application, a desktop application, and a mobile application compatible with a computing device 600. As will be detailed with reference to FIG. 6 below, the computing device through which platform 100 may be accessed by users 130 may comprise, but not be limited to, for example, a desktop computer, laptop, a tablet, or mobile telecommunications device.

Platform 100 may comprise, but not be limited to, for example, the following components:

i) a content capturing component configured to capture content from a plurality of capturing devices (e.g., capturing devices 105);

ii) a content transmission component configured to communicate the captured content (e.g., venue networking devices 107);

iii) a content ingestion component to receive and store the captured content (e.g., data center 110);

iv) a processing component configured to process content so as to generate broadcast streams associated captured content (e.g., data center 110);

v) a content delivery component to provide the captured content to end-users of the platform (e.g., delivery networks 115a-c); and vi) a computer generated imagery (CGI) component for visualizing data associated with the captured content.

a. Content Detection and Capture

Platform 100 may comprise, but not be limited to, for example, system architectures, apparatuses, methods, and processes comprising multiple detection and capturing devices 105. Detection and capturing devices 105 may comprise, but not be limited to, video cameras, microphones, accelerometers, and location detection systems and methods. It should be understood that detection devices and capturing devices may be used interchangeably throughout the present disclosure.

Capturing devices 105 are further detailed in incorporated Provisional Application No. 62/026,475, entitled "Wearable System with Integrated Peripherals,", filed on Jul. 18, 2014 in the name of Saeed Z. Anwar and Tenzing P. Tshering (hereinafter referred to as the '475 disclosure). Accordingly, any reference made herein to a capturing device, detection device, sensing device, or any other means for data collection may, where necessary for enablement (should such detail not be evident to one of ordinary skill in the art after studying the present disclosure), include features and functions of the '475 disclosure.

As will be understood in greater detail infra, detection and capturing devices 105 may be incorporated into, for example, but not limited to, a helmet. For example, in some embodiments, platform 100 may be deployed for athletic events having multiple players (e.g., football games). Thus, in accordance to the various embodiments disclosed herein, each football player may have at least one camera embedded within his helmet. In addition, the player's helmet may further comprise wireless transmission elements, such as, for example, Wi-Fi based communication circuitry.

b. Content Transmission

Still consistent with embodiments of the present disclosure, platform 100 may be enabled to receive and ingest captured content from each players' integrated capturing devices 105. Each player's integrated capturing device 105 (e.g., the aforementioned helmet having a camera and transmission technology integrated therein) may provide captured video and audio streams for processing at, for example, data-center 110.

As will be described in greater detail infra, the integrated capturing devices may be associated with wireless communication circuitry. The communication circuitry, in turn, may be enabled to transmit the captured content to various wireless access points 107 located throughout the venue. In turn, wireless access points 107 may be operative to forward to the received transmissions to, for example, data-center 110 for content ingestion and processing. Such communication may be bi-directional.

Conventional Wi-Fi, Bluetooth, and Internet Protocol (IP) communication techniques may be used in transmitting the captured content. Although the present disclosure makes reference to Wi-Fi, Bluetooth and IP protocols of communication, it is anticipated that any communication protocol suitable for transmitting captured data may be employed by platform 100.

c. Content Ingestion and Processing

Platform 100 may comprise infrastructure to receive and ingest these streams for processing and formatting purposes.

Such infrastructure may be located, at least in part, within data center 110. The streamed content, in turn, may provide viewers with various points of view for the venue. A point of view may comprise, for example, a processed content stream or a plurality of processed content streams based on various processing rules.

Content processing may comprise a plurality of processing layers. Each processing layer may be configured to perform a particular processing task. For example, a first layer may be associated with image stabilization, while a second layer may be associated with content stitching (as will be detailed infra). Additional layers may be associated with, but not limited to, image focus, digital overlays, and various other digital signal and imaging processing capabilities.

Embodiments of the present disclosure may be operative with processing rules. Processing rules may be employed by the platform to provide a particularly process content for streaming. Each processing layer may be activated or deactivated based on at least one rule governing the processing of the content, and points of view, as will be detailed below, may be provided accordingly.

Video Processing is further disclosed in incorporated Provisional Application No. 62/059,378, entitled "Point of View Video Processing and Curation Platform,", filed on Dec. 13, 2013 in the name of Saeed Z. Anwar and Tenzing P. Tshering (hereinafter the '378 application). Accordingly, any reference made herein to a content/video/audio/data processing herein may, where necessary for enablement (should such detail not be evident to one of ordinary skill in the art after studying the present disclosure), include features and functions of the '378 disclosure.

d. Content Delivery

Platform 100 may be configured to distribute the processed content through multiple channels. Accordingly, in yet further embodiments of the present disclosure, the platform may facilitate the distribution of formatted content over broadcast TV and CDNs (e.g., networks 115a-115c). For example, in various embodiments of the present disclosure, the content generated through the platform's capture and processing of content may result in, for example, video streams that can be distributed to consumers through existing distribution channels, such as, but not limited to, for example: Broadcast, Replay TV, NFL RedZone, Twitter Clips, Stadium Jumbotrons, In-Stadium Fan Entertainment, and News Channels.

Furthermore, platform 100 may provide, or, in some embodiments, may be associated with, new distribution channels for the processed content. For example, the processed content may be provided through, but not limited to, for example, interactive computing applications compatible with streaming video, including, but not limited to Web Apps, Desktop Apps, Mobile Device (iOS, Android, Windows) Apps, and the like.

These applications may connect to platform 100 and enable an end-user 130 to select, for example, a broadcast feed to stream through the application. The broadcast feed streams may be made available to the application through an operating entity associated with platform 100. In some embodiments, the application may comprise a user interface (provided via computing device 600) for selecting the broadcast stream and a multimedia playback component for playing the selected broadcast stream. User 105 of the application may further be enabled to select a point of view. As mentioned above, point of view may be a processed video stream or a plurality of processed video streams based on various processing rules.

Referring back to the context of the football game implementation of platform 100, by means of an application associated with the third component, user 130 of platform 100 may select, for example, a desired point of view. Still consistent with embodiments of the present disclosure, user 130 of platform 100 may opt to select which player's helmet camera (e.g., detection and capturing device 105) to view. In turn, by selecting a direct camera view rather than a processed "point of view," the user of the platform may be provided, for example, a raw feed with minimal processing. In this way, embodiments of the present disclosure enable users 130 to control the content provided to them, thereby providing a more on-demand, interactive experience with the venue and the event therein.

A content operator may be enabled to operate the platform either from data center 110 or remotely at a venue from which content is being captured. The operator may access a control panel comprising a user-interface having a plurality of controls for operating the detection, transmission, processing, and provision components of the platform. Similarly, users 130 may access platform (e.g., via the software application as detailed in FIG. 6) to select various views associated with content and receive the transmission of the selected views from platform 100. The platform elements may be employed to ingest, reformat, and deliver content captured by the cameras and microphones. In turn, the content may be used in, for example, commercial business channels including broadcast television (TV) and content distribution networks (CDN).

e. Computer Generated Imagery

Consistent with embodiments of the present disclosure, platform 100 may be operative to process the data captured from the various detection devices and render various computer generated imagery (CGI). As will be detailed infra, the CGI may simulate the content captured by the detection and capturing devices 105 in an interactive computing environment that gives a user of the platform control over the representations of the captured content. For example, using CGI based on the captured content, platform 100 may provide an interface that represents the field, the players, and the plays executed by the players, with various controls as to the point of views, play-back, and statistics associated therewith.

III. PLATFORM ARCHITECTURE

Figure 2:
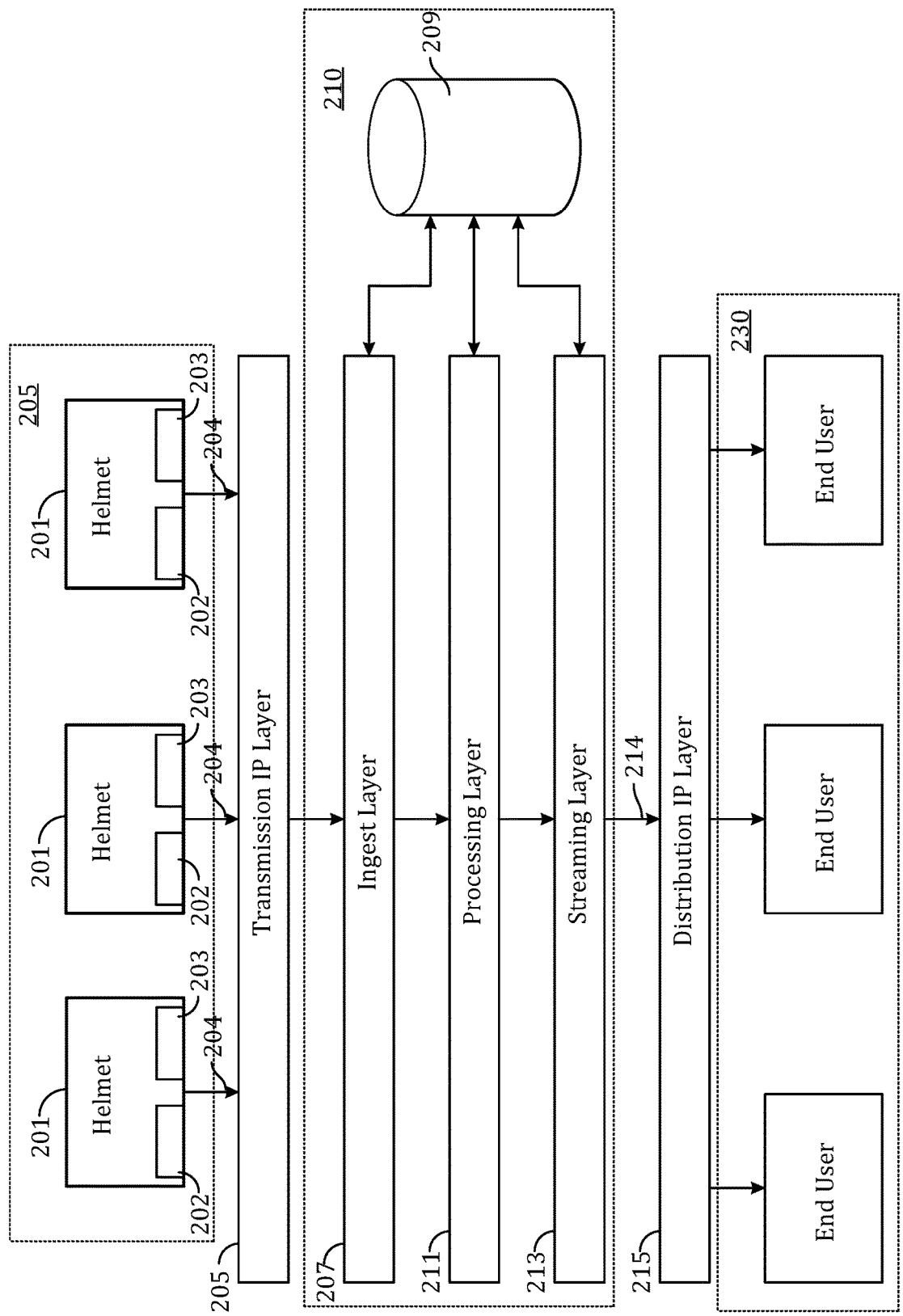
FIG. 2 illustrates an embodiment of an architecture for providing the POV platform.

FIG. 2 is a block diagram of an architecture for providing the multimedia platform in accordance to one possible embodiment of the present invention. The block diagram illustrates an end-to-end delivery of multiple detection devices, represented by labels 202 and 203, to multiple end-user destinations, represented by label 217.

a. Content Detection and Capture

The detection devices may comprise video and audio sources, such as, for example, video cameras and microphones. Still consistent with embodiments of the present invention, the detection devices may further comprise orientation and acceleration sensing devices, such as, for example, compasses and accelerometers. In yet further embodiments, the detection devices may detect a position associated with the detection device. In these embodiments, the detection devices may further comprise components for performing location triangulation methods as well as, for example, global positioning systems, Radio Frequency Identifier (RFID), and Timing and Inertial measurement Unit (TIMU) components.

In various embodiments, the detection devices may be integrated into a portion of a player's equipment such as, for example, but not limited to, a player's head-gear, represented by label 201. Still consistent with embodiments of the present invention, the detection devices may be attached to any suitable portion of a player's equipment. For example, gyroscopic movement detection devices may be attached to a player's appendages. The data captured by the gyroscopic movement detection device may be translated into, for example, a virtual simulation of the player. When combined with the other detection devices associated with the player's equipment, a substantial virtual reality simulation may be provided to the user.

Consistent with embodiments of the present invention, each player in, for example, a football game may be associated with at least one detection device. Then, the various audio and video sources associated with the players may be combined, in a Processing layer, as represented by label 211, to provide numerous points of view of the sporting event. The points of view, in turn, may be provided to an end-user of the platform for selection.

b. Content Transmission

Still consistent with embodiments of the present invention, the platform may be enabled to receive and ingest captured content from each player's integrated capturing devices. Each player's integrated capturing device (e.g., the aforementioned helmet having a camera and transmission technology integrated therein) may provide, through the communication circuitry, captured video and audio streams for processing.

The communication circuitry may comprise electromagnetic transmission and reception components. The transmission components may be used to communicate the captured video and audio signals to external entities, whereas the reception components may be used to enable an operator to monitor and control the detection devices integrated into the helmet.

Wireless access points may be located throughout the venue. The communication circuitry integrated into the players' helmets may be operative to connect to a nearest access point to maintain a line of communication with high integrity and connectivity. In turn, these wireless access points may be operative to forward to the received transmissions to, for example, a data-center for content ingestion and processing.

Although the present disclosure references wireless access points, conventional Wi-Fi, Bluetooth, and Internet Protocol (IP) communication techniques may be used in transmitting the captured content. Although the present disclosure makes reference to Wi-Fi, Bluetooth and IP protocols of communication, it is anticipated that any communication protocol suitable for transmitting captured data may be employed by the platform.

c. Content Ingestion

All data captured by detection devices may be transported over an Internet Protocol (IP) layer, represented by labels 205 and 206, to an Ingest layer, represented by label 207. In various other embodiments, the data captured by detection devices could be transported to the IP layer through an interim Wi-Fi or Bluetooth bridge layer, represented by label 204. Wi-Fi and Bluetooth infrastructure for the communication of captured data to the Ingest layer may be installed at various points throughout the venue hosting the event.

In the Ingest layer, the captured data may be stored in a storage device, represented by label 209. The storage device may be scalable using RAID or SAN methods known to those of ordinary skill in the field of information technology systems. In some embodiments, the storage device may reside in a cloud-computing environment. Accordingly, the connection, represented by label 208, to the storage device may be over, for example, a standard IP connection.

Having received and stored the captured data, the Ingest layer may parse and label the captured data. For example, the Ingest layer may embed metadata within the data, indicating various properties of the data, such as, but not limited to, for example, capturing device location, inertia, and a time associated with the captured data.

d. Content Processing

The ingested data may then be provided to a Processing layer, such as the Video and Audio Processing layer, represented by label 211. Though FIG. 2 illustrates a Video and Audio Processing layer, the Processing layer may be capable of processing any captured data form any type of detection device. In this way, real-time data associated with all available detection devices may be provided to and processed by the Processing Layer.

In accordance to embodiments of the present invention, the Processing layer may comprise data and image processing sub-layers, such as, but not limited to, for example, software based image stabilization, digital signage, image focus, content overlay, and various other digital signal and image processing functions. The Processing layer may process the captured data to provide various points of view to the content delivery layer of the platform which, in turn, provides the various points of view for user selection and streaming.

A point of view may comprise, for example, a processed video stream or a plurality of processed video streams based on various processing rules. Content processing may comprise a plurality of processing sub-layers. Each processing sub-layer may be configured to perform a particular processing task. For example, a first sub-layer may be associated with image stabilization, while a second sub-layer may be associated with content stitching (as will be detailed below). Additional sub-layers may be associated with, but not limited to, image focus, digital overlays, and various other digital signal and imaging processing capabilities.

The platform may be compatible with plug-in modules that provided extended layer processing functionality. For example, an operator of the platform may be able to independently install additional processing functions through third-party developers. In this way, the platform may be constantly updated with new processing functionalities.

Embodiments of the present invention may be operative with processing rules. Processing rules may be employed by the platform to provide a particularly process content for streaming. Each processing sub-layer may be activated or deactivated based on at least one rule governing the processing of the content.

By way of non-limiting example, one rule may be, for example, a "Follow the Ball" rule. This rule may cause the appropriate content to be ingested and processed based on a tracking of the ball's location and a determination of which players (and corresponding content capturing devices) are in proximity to the ball's location. The ball's location may be detected by, for example, imaging processing techniques or a small detection devices implants on the ball. In turn, the platform may be operative to process the content so as to sequence the streaming of video feeds associated with capturing devices as they come into proximity to the ball's location.

An operator of the platform may create and configure points of view for transmission to users of the platform. The configuration of the point of view may entail a configuration of the associated processing rules and sub-layers for processing the ingested content to provide the point of view.

In yet further embodiments of the present invention, the platform's processing component may be configured to stitch a plurality of video feeds. A stitched video feed may comprise a video feed that is combined from the video feeds provided by a plurality of capturing devices. In this way, a user of the platform may be provided with a hemispheric view of the event from the perspective of multiple capturing devices. For example, during a football game, the platform may provide a user with the hemispheric view of a football field by combining the video feed generated by multiple cameras integrated into a football player's helmet cameras.

As the lens, angles and distance of separation between the cameras on the helmet may be known, the captured images may be subsequently stitched together to produce the hemispheric view. In some embodiments, the captured images may be stitched together using image processing techniques irrespective to the lens, angles, and camera separation. In turn, the stitched hemispheric view may be provided through the platform. A user of the platform may simulate a rotation of the camera by navigating to different parts of the hemispheric view.

Still consistent with some embodiments of the present invention, a helmet camera may be configured with a mechanical rotation means. The mechanical rotation means may be in remote operation by the platform, which may include, but not be limited to, an operator or a user of the platform. As will be further detailed below, a user may be provided access to control the mechanical rotation means through, for example, through an application of the platform.

The points of view may provide a video feed and an audio feed associated with a player's detection devices. In some embodiments, the audio feed may be from a universal audio source while the video feed may correspond to a selected player's video source. In other embodiments, the video feed may be from a universal video source while the audio feed may correspond to a selected player's audio source. In various embodiments, detection devices may be mixed, stitched and matched with detection devices and over various periods of time to produce various points of view for user selection.

As mentioned above, the platform may also provide stitched content. Accordingly, the Processing layer may be further configured to create aggregated, panoramic and 3D point of views based on the captured data. In this way, when a platform operator instructs the platform to aggregate multiple video sources from multiple players, then the Processing layer may create and process a new point of view based on a set of processing (or "business") rules.

The business rules may be provided by an operator of the platform through, for example, a web server interface for entering business rules. In this way, the business rules may be dynamically provided and enabled on-demand. The business rules may comprise, for example, instructions for enabling or disabling particular sub-processing layers and corresponding video and audio streams generated by the Processing layer.

For instance, if the all the detection devices for the quarterback are streamed out from the streaming servers, then these rules may be set via the Video/Audio processing layer to provide a point of view associated with the quarterback. In this way, content is ingested and transmitted to the processing layer, which processes the ingested content based on rules.

In this way, business rules may enable the processing of video and audio streams by, for example, providing image quality control (e.g., stabilization and focus), image stitching (e.g., combining a plurality of feeds), and image sequencing (e.g., a "Follow the Ball" point of view).

e. Content Delivery

Video and audio streaming of specific views may be performed by the Data Streaming Servers, as represented by label 213. The streaming content may be provided to the Data Streaming Servers via the Processing layer. A standard IP communication protocol, as represented by 214, may be used to stream the content. The streaming may occur via a unicast or multicast broadcast transmission, as represented by label 214.

For example, in various embodiments, the processing layer may multicast all streams. If a stream is for broadcast, the processing layer may have one multicast address to the broadcast organization. However within the same multicast address, the storage servers will receive a stream to record and that way, yes, we will be able to retransmit.

Similarly, for CDN multicast, the storage devices will be within the same multicast address. Although the storage devices are being used for the ingestion, processing, and delivery layers, there may be no penalty on the performance. For instance, the multicast may be handled with a switch-router. So, although the processing layer may select the multicast address for streaming, the switch-router may, in some instances, already be configured with the storage devices on the same multicast to receive the stream. The video and audio streaming servers may connect to the storage drive over a standard IP connection for specific views to stream based on the direction of the video and audio processing layer.

End users, as represented by label 217, may be presented with, for example, a plurality of point of views for selection via the end-user application. As mentioned above, each point of view may correspond to, for example, a player or a combination of players as generated by the Process layer. Upon selection of a point of view, the application may trigger a transmission of content and/or processed content associated with the point of view. In turn, the end users may receive, for example, the corresponding audio and video streams associated with the content. The Intranet or Internet layers, represented by labels 215 and 216, may serve as the transmission medium for the content streaming. Still consistent with embodiments of the present invention, and as will be detailed below, the content may be available not only to end users of the platform, but to various broadcasting entities.

As mentioned above, the platform consistent with embodiments of the present invention may provide an application that enables the user to select hemispheric views associated with particular players. In turn, the end-user application providing the streaming point of view content to the user may enable the user to simulate a rotation of a camera. In this way, the user may be able to navigate a view in, for example, a 360 degree environment surrounding a particular player, thereby providing a simulated sense of interactivity within the venue. In some embodiments, the platform may auto-simulate rotation within the hemispheric view. This may be employed, for example, "Follow the Ball" points of view, wherein the hemispheric view may be centered in the directional cardinality associated with the ball.

In various embodiments, the end-user application may be operative with various input devices. For example, a user may wear a device comprising a plurality of detection devices. In some embodiments, the detection device may comprise, for example, virtual reality glasses. The virtual reality glasses may detect a motion and orientation of the user's head. The turning, rotation, or movement of the user's head may cause a corresponding simulation of a rotation within the 360 degree hemispheric view. In other embodiments, the user may control the camera orientation with, for example, a keyboard, mouse, touch screen, and/or various hand gestures.

IV. PLATFORM INTEGRATION

Figure 3:
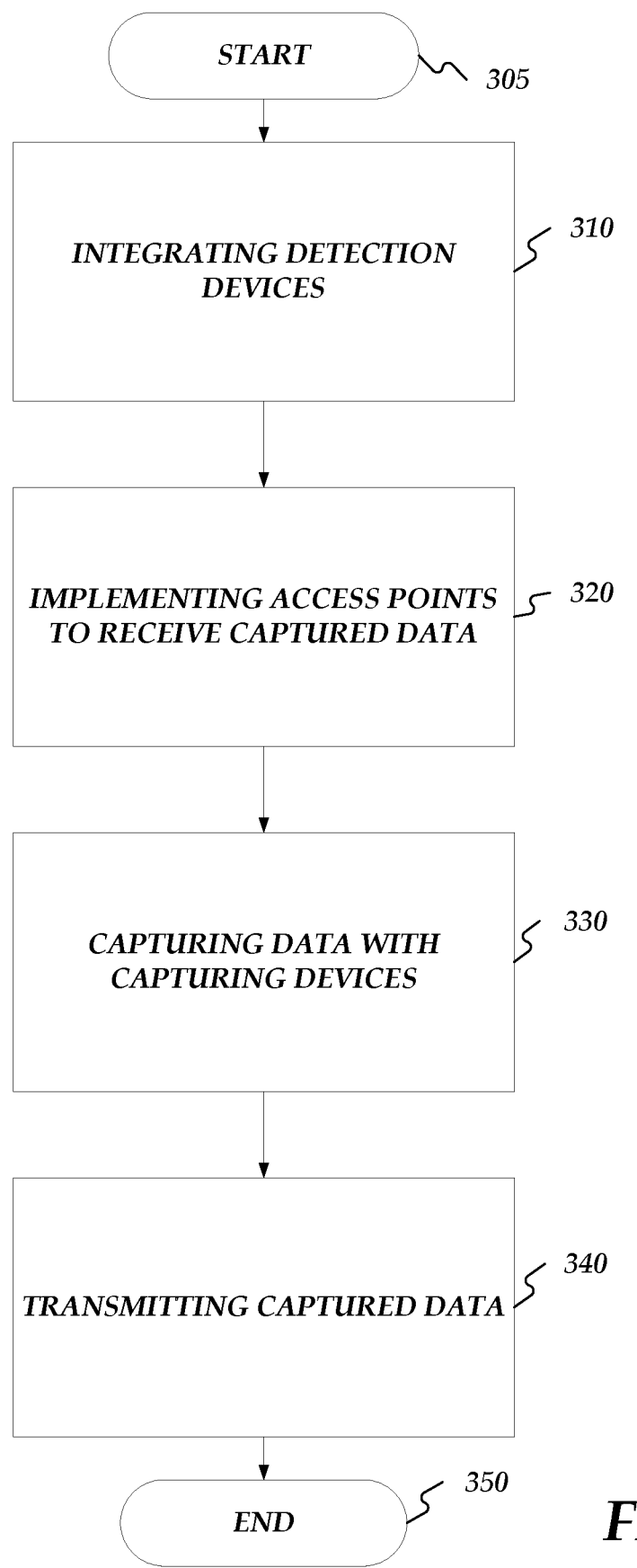
FIG. 3 is a flow chart of a method for providing venue integration and operation.

FIG. 3 is a flow chart setting forth the general stages involved in a method 300 consistent with an embodiment of the invention for providing venue integration and operation. Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 300-500 will be described in greater detail below. By way of non-limiting example, the venue may comprise a sports stadium and the event within the venue may be a football game. Method 300 may be performed, at least in part, by an entity responsible for providing, for example, football player equipment. In various embodiments, the entity providing the equipment may work in conjunction with technology manufactures such as, for example, camera, microphone, and other detection device manufactures in accordance to the technology disclosed in conjunction with method 300. Moreover, venue owners may also perform at least a portion of method 300.

Still consistent with embodiments of the present invention, portions of method 300 may be performed by a processing unit coupled to a memory storage (e.g., a computing device). The computing device may be integrated into, for example, a helmet of at least one player of the football game or elsewhere within the venue. As will be detailed below, the computing device may be operative to communicate data within the venue and, in some embodiments, outside of the venue. Ways to implement the stages of method 300 will be described in greater detail below. Method 300 may begin at starting block 305 and proceed to stage 310 where at least one detection device may be installed within the venue.

a. Equipment Integration

Consistent with embodiments of the present invention, equipment within the venue may be equipped with technology configured to capture, process, and transmit data. The data may relate to an event taking place within the venue (e.g., the football game in the sports stadium). Accordingly, by way of non-limiting example, a capturing device may be installed within a football helmet. In turn, the helmet may be worn by a football player during the football game.

The capturing device may comprise a video camera. In some embodiments, the helmet of the player may be further integrated with a microphone and additional cameras. The cameras may be positioned in such a way to capture different angles of the player's point of view. Moreover, an additional helmet camera may be integrated into the helmet to capture the player's face. Additional embodiments may comprise integrating a microphone into the helmet for capturing audio.

In some embodiments, movement detection devices may be integrated into other portions of the player's equipment. For example, in various embodiments, accelerometers may be implemented within the player's equipment. In turn, and as will be detailed below, the data captured by the movement detection devices may be processed with, for example, Timing and Inertial Measurement Unit (TIMU) technology to find the player location. In this way, the player's position may be estimated based on analysis of the captured data.

Still consistent with embodiments of the present invention, location detection devices may be integrated into the player's equipment. For example, Global Positioning Systems (GPS) and/or RFID devices may be integrated into the player's equipment. In turn, the RFID devices may be used to triangulate the player's location.

Still consistent with embodiments of the present invention, at least one processor may be integrated into the player's equipment. The at least one processor may be configured to operate in conjunction with the various integrated capturing devices. The processor may be configured to perform various pre-transmission processing.

Furthermore, a transceiver may be integrated into the equipment. The transceiver may be configured to transmit data captured by the capturing devices. The transceiver may be further configured to receive control data. The control data may enable an operator to remotely operate the detection devices integrated into the equipment. The transceiver may operate on, but is not limited to, for example, a Wi-Fi, Bluetooth, and/or Internet Protocol (IP) communications protocol. The transceiver may be configured to transmit the captured data to at least one data reception device integrated within the venue in stage 320. The transceiver may be further configured to receive control data as indicated in stage 330.

b. Venue Integration

From stage 310, where capturing devices are integrated into the venue, method 300 may advance to stage 320 where at least one wireless access point may be implemented within the venue. At least one wireless access point may comprise, for example, a device configured to receive data from the transceivers associated with the capturing devices integrated into the equipment in stage 310. To ensure compatibility with the transmitting devices, a platform operator may work in conjunction with the entity integrating the equipment with the transmission devices.

Consistent with embodiments of the invention, one or more wireless access points may be implemented to receive the video, audio, accelerometer and location data captured by the devices integrated in stage 310. The access points may comprise but are not limited to, for example, Wi-Fi, RFID, Bluetooth or IP compatible devices. In general, the access points may be arranged within the venue so that at least the playing field within the venue receives signal coverage. In certain embodiments, the capturing devices may be oriented in order to triangulate the position of the player. In this way, the platform may be able to determine which players are located on the playing field and which players are located off of the field.

Still consistent with embodiments of the present invention, a switch may be implemented into the venue. The switch may be configured such that it may allow for the bi-directional flow of data from the venue to a remote entity. The remote entity may comprise, for example, a data center.

In yet further embodiments, the access points may further be able to communicate control signals back to the transmitting devices. For instance, and as will be detailed in stage 330 below, a signal may be transmitted to the integrated equipment to commence or terminate the capturing of data. The signal may be transmitted to the transmitting device in the form of control data. In some embodiments, the control data may be derived by in operator. In other embodiments, the control data may be derived in an automated fashion. For example, when it is detected that a player is located off of the playing field, a control signal may be transmitted to the integrated equipment to terminate data capture. Similarly, when it is determined that the player is located on the playing field, a control signal may be transmitted to initiate the capture of data. These control signals may be transmitted by the access points implemented throughout the venue.

c. Capturing Data

Once the equipment and venue has been integrated to capture, transmit, and receive the data in stages 310 and 320, the on-site infrastructure may be in place for point of view multimedia provision in accordance to embodiments of the present disclosure. Method 300 may continue to stage 330 where the capturing devices may be engaged to capture and transmit the data, while the access points may be engaged to receive the captured and transmitted data. An operator of the Point of View Multimedia Platform may initiate a signal to engage the capturing devices. For example, the operator may be provided an interface for selecting which capturing devices to engage. In turn, the signal may be transmitted to the capturing devices. In various embodiments, the signal may be initiated by a computer determination rather than an operator's manual control.

Upon receipt of the signal, the processing unit associated with the capturing devices may be triggered to engage to capturing devices to commence capturing data. In certain embodiments, the control data transmitted by the operator may further specify which of a plurality of capturing devices associated with the processing unit to engage. Once engaged, the captured data may be transmitted to a reception devices installed within the venue.

Similarly, the operator may be enabled to initiate a single to disengage the capturing devices. Upon receipt of the signal, the processing unit associated with the capturing devices may be triggered to disengage the capturing devices to terminate the capturing of data. In certain embodiments, the control data transmitted by the operator may further specify which of the plurality of capturing devices associated with the processing unit to disengage.

d. Transmitting Data

After the data is captured and transmitted to the reception devices within the venue in stage 330, method 300 may proceed to stage 340 where the access points transmit the captured data to a processing entity. The processing entity may comprise, for example, a data center.

As described above, the access points may be in operational communication with a switch. Once the access points received the captured data, the access points may be configured to route the captured data to the processing entity. In various embodiments, such routing may entail a transmission of the captured data from the venue to the data center over, for example, a Power over Ethernet (PoE) Switch. The data may be optionally encrypted before being routed to the processing entity.

Still consistent with embodiments of the present invention, the processing entity need not reside remotely to the venue. Rather, the processing entity, which may perform the processing operations on the captured data, may be located within the venue. Accordingly, in these embodiments, the captured data may be transmitted, from the access points, directly to the processing entity located within the venue. Once the captured data is transmitted to the processing entity in stage 340, method 300 may then end at stage 350.

V. POINT OF VIEW MULTIMEDIA PROVISION

Figure 4:
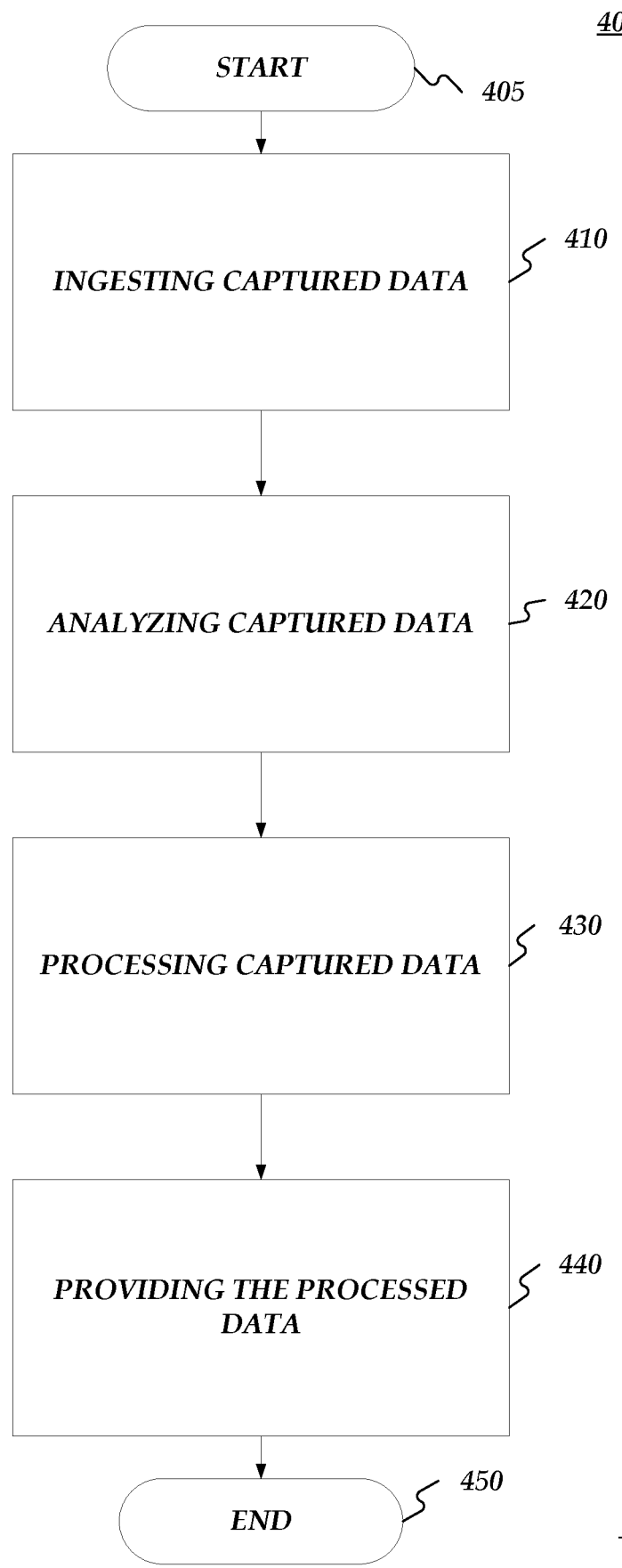
FIG. 4 is a flow chart of a method for providing multimedia point of view service.

FIG. 4 is a flow chart setting forth the general stages involved in a method 400 consistent with embodiments of the invention for providing data ingestion, processing and distribution. Data ingestion, processing, and distribution may be performed by a processing entity. The processing entity may be, for example, a service provider for hosting a point of view multimedia platform. Though the present disclosure details the method as being performed by a single entity, multiple entities may perform the various stages within method 400. For example, a first entity may provide for the data ingestion, a second entity may provide for the data processing, and a third entity may perform the data distribution. In this way, various embodiments of the present disclosure may be licensed to multiple entities. In turn, the multiple entities may operate in accordance to a set of operational standards to collectively provide a point of view multimedia platform.

The point of view multimedia platform may be implemented in accordance to, for example, the '915 disclosure. In various embodiments, the platform may be provided by a single entity, whereas in other embodiments the platform may be provided by multiple entities.

The processing entity may comprise at least one system for providing data ingestion, processing, and distribution for performing the stages of method 400. The system may comprise one computing device, or a plurality of computing devices. The system may further comprise a storage device, or a plurality of storage devices operating in association with the computing device. One embodiment of the system is disclosed with reference to FIG. 6 below. The system and its associated at least one computing device may reside in a cloud-computing environment and may be accessible by venue operators, platform operators, content distributers, and end-users from remote locations.

The processing entity may employ the system, at least in part, to perform method 300. In this way, the processing entity may transform the data received from the venue into point of view content. In turn, the point of view content may be provided to third parties for distribution and/or consumption.

Method 400 may begin at starting block 405 and proceed to stage 410 where at least some of the captured data may be ingested into a database within a storage device associated with the system. Data ingestion may comprise, for example, receiving, pre-processing, and storing of the data from a transmitting device located at, for example, the venue from which the data originates.

Once the data is received in stage 410, method 400 may proceed to stage 420 where the received data may be analyzed to determine the metadata that may be appended thereto. In this stage, the ingested data may be analyzed to determine a set of metadata. An operator of the system may perform the analysis. In various embodiments, the analysis may be automated by the system.

For example, the data originating from the various capturing devices may comprise video data, audio data, location data, inertia data, triangulation data, and the like. In turn, this metadata may be used to readily identify, organize, and store the data. In various embodiments, the metadata may be used to construct a virtualization of the venue. The virtualization may use computer generated imagery (CGI) to simulate the event within the venue. Details regarding the CGI and its associated functionality are disclosed in the '915 disclosure.

From stage 420, where the data is received and metadata appended thereto, method 400 may advance to stage 430 where the data is processed. Consistent with embodiments of the invention, the data may be processed according to processing rules. The rules may be received, for example, from an operator selecting the rules. The rules may also be received from a point of view selection, as will be detailed with reference to FIG. 5, which may be used to determine additional rules. The point of view may be associated with, for example, a detection device, a plurality of detection devices, the venue, or an event occurring within the venue. A plurality of processing rules are detailed in the '915 disclosure. In addition, related Provisional Application No. 62/059,378, entitled "Point of View Video Processing and Curation Platform," (hereinafter the '378 disclosure), details content processes.

The processing may commence in response to a triggering event. The triggering event may be signaled in response to, for example a player moving onto the field. A plurality of other triggers are detailed in related '915 disclosure. In addition, related Provisional Application No. 62/026,475, entitled "Wearable System with Integrated Peripherals," (hereinafter the '475 disclosure), details additional triggers.

In various embodiments, the metadata associated with the data may be monitored to determine whether a triggering event occurred. The monitoring may be performed by an operator or comprise an automation performed by the system.

Still consistent with embodiment of the present invention, the processing may be triggered by, for example, but not limited to, a signal received from the operator, the detection of a triggering event, and/or an end-user selection as will be detailed in FIG. 5 below. Once triggered, the processing may be based on the determined processing rules. In some embodiments, the processing may occur in layers.

The data may be retrieved from storage for processing. Once retrieved, the data may be processed according to, for example, but not limited to, the following list of ways: Image focus, image stabilization, image stitching, digital overlays, digital signage, or various other digital signal processing (DSP). Image stitching may be used to provide, for example, hemispherical views, panoramic views or 3-dimensional views, and is detailed in the '915 disclosure and the '378.

From stage 430, where the data is processed, method 400 may advance to stage 440, where the processed data is provided to a third party. For example, consistent embodiments of the present invention, the processed data (e.g., the point of view content) may be delivered through a plurality of distribution channels. The distribution channels may comprise, for example, unicast, multicasting, in-venue closed circuit broadcasting, a content distribution network (CDN), online application, and/or other form of content streaming infrastructure.

The distribution channels may provide the content to entities licensed to receive the content. Moreover, in various embodiments, the licensed entitles may only be enabled to receive the content using licensed and registered devices and/or licensed and registered software installed on those devices. Each registered device and/or software may comprise a unique identifier. In this way, the content consumed by the licensed entity may be monitored. In turn, the monitored entity may be billed for the consumption of the content. The licensed entities may comprise, but not be limited to, for example, content distributors and/or content consumers (e.g., end-users of the platform as detailed in FIG. 4 below and in the '915 disclosure).

Still consistent with embodiments of the present invention, different entities may be granted different content rights. The content rights may be distributed based on, but not limited to, for example, entity type, location, affiliation, infrastructure, distribution channel, venue type, venue location, event type, event location, and various other parameters. By way of non-limiting example, the National Football League may elect to license through a first set of distribution channels and a first set of content providers, while the National Hockey League may elect to license content through a second set of distribution channels and a second set of content providers.

Similarly, one venue may elect to license content captured within their venue only to platform users located within their venue, while a second venue may elect to license content captured within their venue only to platform located outside of their venue. The device manufactures, venue providers, event organizers, and content distributors may employ a plurality of cross licensing schemes, subject to various terms and conditions, which may include, but are not limited to, for example, revenue sharing.

In some embodiments, each entity may use its own proprietary software to allow their users to view the distributed content. The software may be designed to accommodate a user-type. For example, a coach of a football team may receive a first type of software having a first set of capabilities for viewing the content, while a viewer may receive a second type of software having a second set of capabilities for viewing the content. Once the data is delivered to the end user in stage 440, method 400 may then end at stage 450.

VI. END-USER OPERATION

Figure 5:
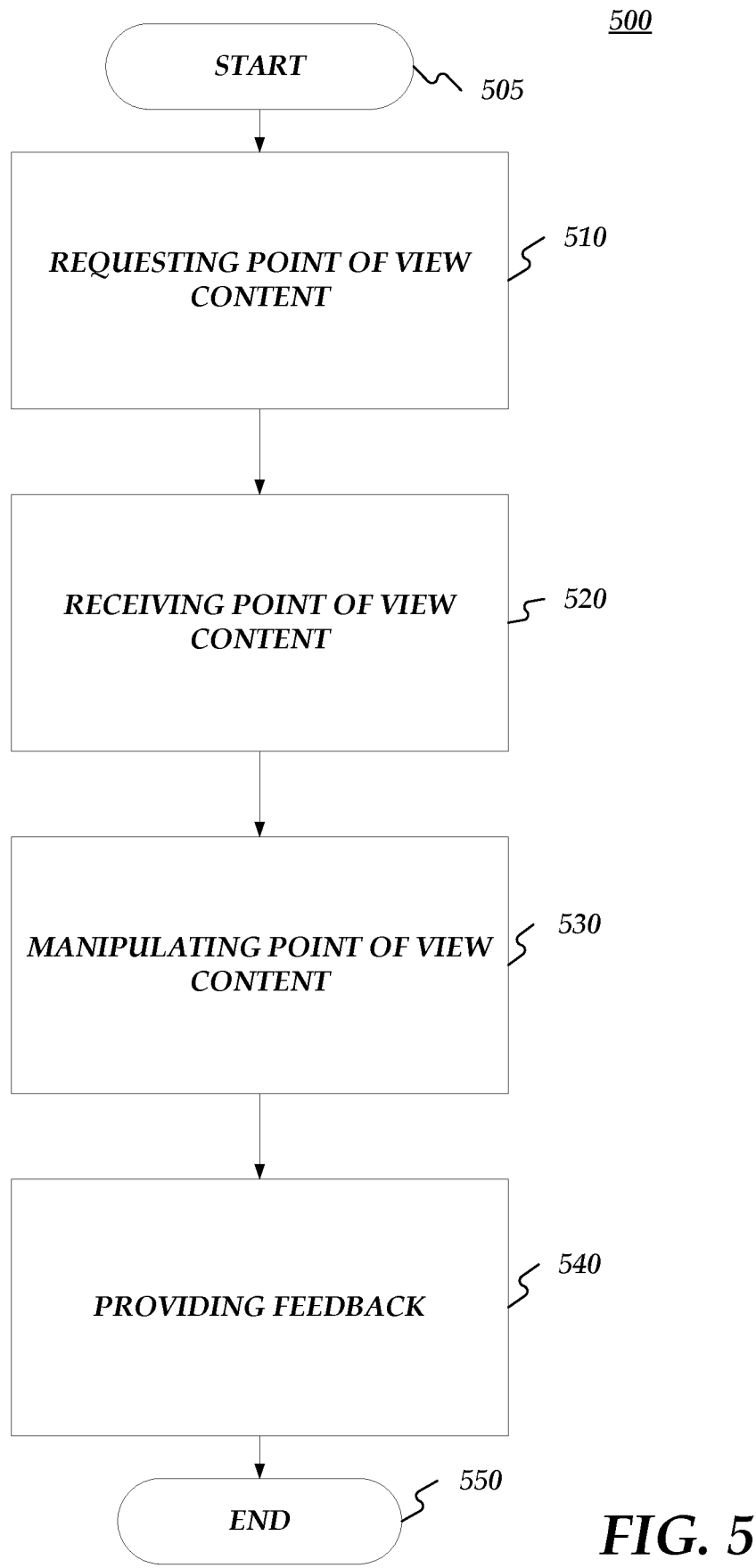
FIG. 5 is a flow chart of a method for providing end-user content.

FIG. 5 is a flow chart setting forth the general stages involved in a method 500 consistent with embodiments of the invention for providing a user interface for receiving point of view content. By way of non-limiting example, point of view content may be received by a registered user of the platform. The user may employ software to receive the point of view content. The software may be embodied in a computing device, such as, but not limited to, for example, a mobile device, a desktop device, a set-top-box, and/or any other telecommunications enabled device. FIG. 5 shows one embodiment of a computing device that may be enabled to receive the point of content. At least portions of method 400 may be implemented using, for example, the computing device.

Method 400 may begin at starting block 505 and proceed to stage 510 where an end-user requests point of view content. The end-user may be enabled to request the point of view from a user-interface of the registered software. The software may provide various points of view for user selection. The points of view provided for selection may be, for example, limited by the type of user, the type of software registration, a location of the user, and various other licensing parameters. Embodiment may allow the end-user to select which data to receive through, for example, a keyboard, mouse, touch screen, virtual-reality glasses or hand gestures combined with a gesture recognition device. In some embodiments, the user may be enabled to request a customized point of view. The customized point of view request, in some embodiments, may undergo operator approval and configuration so as to determine the necessary processing rules to provide the customized point of view.

The request may be transmitted to the processing entity. Upon receipt of the request, the processing entity may perform the necessary operations to prepare the point of view content for delivery. The operations may comprise, but not be limited to, for example, an initiation of capturing of data within the venue, the storage and labeling of the data, and processing the data to provide the content. The processing may comprise the organization of data from a plurality of sources, either sequentially or in parallel. Details regarding the various point of views and corresponding processing is disclosed in the related '915 application and the '378 application.

Once the point of view is requested in stage 510, method 500 may advance to stage 520 where the processed point of view content is passed off to a content distribution entity for delivering the requested content to the end user. In turn, the distribution entity may transmit the content to the end-user device. In various embodiments, the end-user device may receive the content directly from the processing entity. The received content may be formatted to accommodate the end-user device. The formatting may be performed by the processing entity, distribution entity, or the end-user device. The end-user device, in operation with the software, may playback the received content. Playback may include, for example, audio and visual multimedia playback. In some embodiments, the playback may accompany tactile feedback that may correspond to the multimedia playback.

Still consistent with embodiments of the present invention, the requesting end-user device may be located in a first location, but the content playback associated with the requesting end-user device may be located in a second location. In this way, the user may employ, for example, a mobile device comprising the registered software to request a point of view content that may, in turn, be transmitted to a set-top box registered to the user. In turn, the set-top box may provide the requested point of view content to, for example, at least one television connected to the set-top box.

From stage 520, where the end-user receives the point of view, method 500 may advance to stage 530, where the end-user may manipulate the received content. Consistent with embodiments of this invention, the end-user may then, for example, display the received data on one or more screens. For instance, Picture-in-Picture (PiP) may allow the user to experience the events from multiple angles. The end-user may also experience the corresponding audio and stream the audio to different audio output devices. In this way, different screens may display different requested points of view. This scenario may be useful in a social environment, such as another venue, restaurant, bar, and the like.

Furthermore, the end-user may have the ability to store the data feed. In turn, the stored data feed may then enable the end-user to stop, rewind and fast-forward his views. Still consistent with embodiments of the present invention, the end-user may also have the ability to manipulate the data, for example, by reorienting the players such that a different view can be displayed. This may be used, for example, by a coach who is showing old film and trying to describe the proper positioning to a player. Here, the disclosure of the CGI in related '915 disclosure may be applied to provide various functionalities associated the received content. In some embodiments, the end-user may also be able to add sound effects or adjust and filter the sound. As an example, filters may be used to eliminate crowd noise so that the player's voices may be more clearly streamed.

The end-user CGI aspects may present a separate licensing model for Point of View Multimedia Provision consistent with embodiments of the present invention. For example, a sports team coach may wish to receive more functionality in his point of view content provision. At a premium rate, the coach may be provided with the additional CGI aspects disclosed in the '915 disclosure. Similarly, the coach may wish that data captures associated with his team may not be available to any other entity in a CGI format. Embodiments of the present invention contemplate various licensing schemes for providing CGI compatible content.

From stage 530, where the end user manipulates the data, method 500 may advance to stage 540, where the end-user provides feedback. The feedback may be provided to various other end-users, enabling a chat-like environment. In other embodiments, the feedback may be provided to a processing entity or distribution entity. For example, the end-user may notice that one camera or a microphone needs adjustment before the data distributer makes this realization. Once the end-user completes stage 530 by sending feedback, method may end at stage 540.

VII. SYSTEM FOR PROVIDING MULTIMEDIA POINT OF VIEW CONTENT

The platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service.

Embodiments of the present disclosure may comprise a system having a memory storage and a processing unit. The processing unit coupled to the memory storage, wherein the processing unit is configured to perform the stages of methods 300-500.

Figure 6:
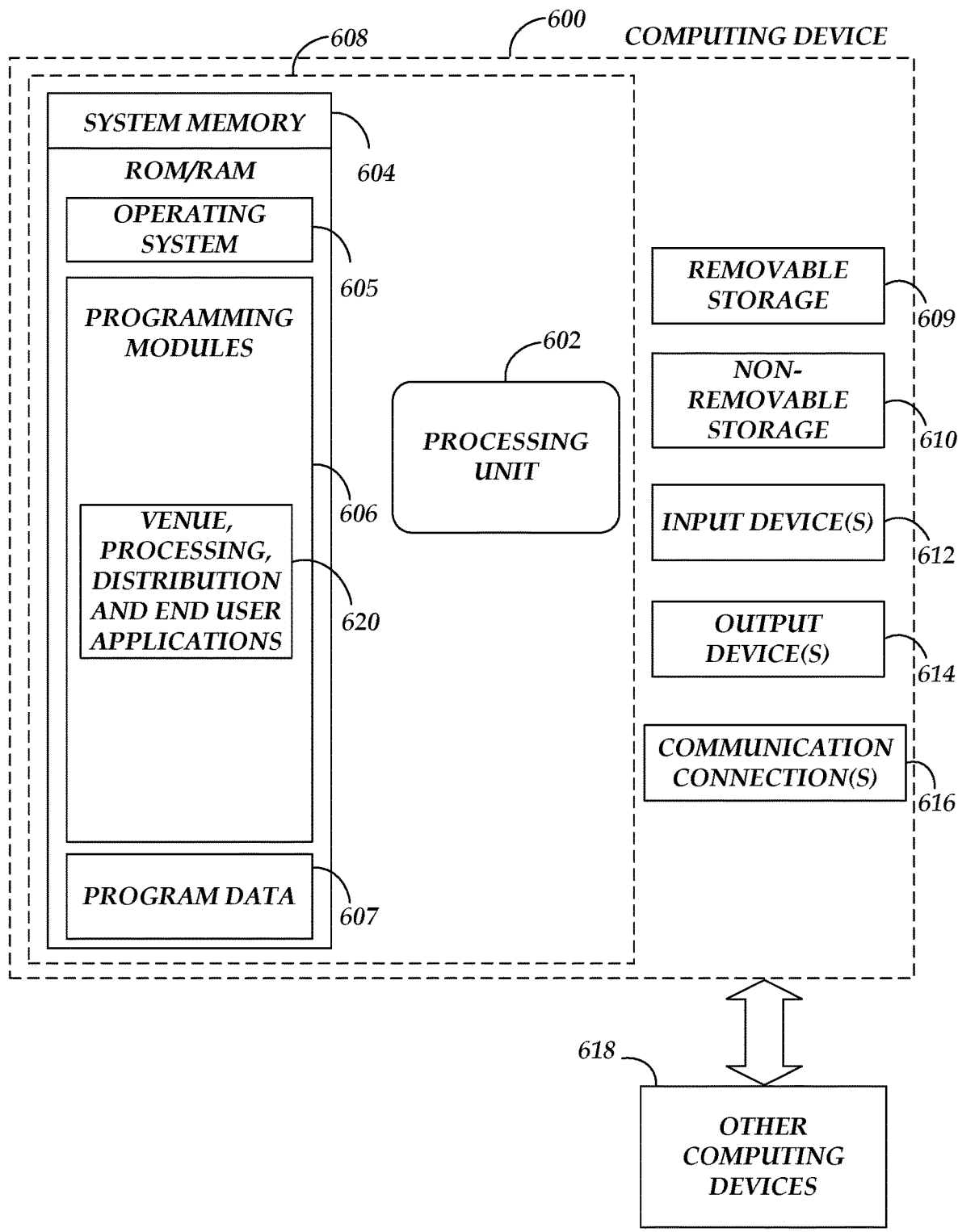
FIG. 6 is a block diagram of a system including a computing device for providing multimedia point of view service.

FIG. 6 is a block diagram of a system including computing device 600. Consistent with an embodiment of the disclosure, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the disclosure.

The computing device may comprise various programming modules. It should be understood that different entities may be provided with different modules that correspond to the tasks set out to be performed by their corresponding entity. For instance, a venue operator may be provided with a first set of programming modules with a first set of user interfaces and functionalities. Moreover, a processing entity operator may be provided with a second set of programming modules and a second set of user interfaces and functionalities. Similarly, the distribution entity may be provided with a third set of programming modules and a third set of user interfaces and functionalities. Further still, the end-user may be provided with a fourth set of programming modules and a fourth set of user interfaces and functionalities. Each corresponding programming modules may be separately licensed to different entities with various restrictions and limitations associated with the content.

With reference to FIG. 6, a system consistent with an embodiment of the disclosure may include a computing device, such as computing device 600. In a basic configuration, computing device 600 may include at least one processing unit 602 and a system memory 604. Depending on the configuration and type of computing device, system memory 604 may comprise, but is not limited to, volatile (e.g., random access memory (RAM)), non-volatile (e.g., read-only memory (ROM)), flash memory, or any combination. System memory 604 may include operating system 605, one or more programming modules 606, and may include a program data 607. Operating system 605, for example, may be suitable for controlling computing device 600's operation. In one embodiment, programming modules 606 may include modules for operating the processing entity, modules for operating the distribution entity, and modules for operating the end-user device. Furthermore, embodiments of the disclosure may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 (e.g., processing entity application, distribution entity application, end-user applications 620) may perform processes including, for example, one or more of the aforementioned methods' stages as described above. The aforementioned process is an example, and processing unit 602 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

VIII. ADVANTAGES OF THE PRESENT INVENTION

The present invention may present a plurality of benefits and advantages over the state of the art. The following list is not meant to be an exhaustive list of these benefits and advantages. Moreover, not every benefit and advantage may be present in every embodiment of the present invention. The present invention may provide the following benefits and advantages:

Enabling the viewing sporting events from a personal point of view leading to heightened engagement of audiences and improved game experience;

Providing an individual viewer a choice of seeing the game from the desired point of view, rather being limited to a single broadcast selection, through the provision of a menu of selectable point of views from different angles within the field of play;

Enabling the viewing of sporting events with the use of cameras from within the field of play vs. cameras outside or above field of play, thereby providing video and audio from a player perspective vs. viewing of a player from a traditional audience perspective;

An ability to provide dynamically aggregated views from multiple players to provide an enhanced view of the field of play, thereby increasing audience participation and field situational awareness;

An ability to provide location data to end clients, thereby increasing audience field situational awareness;

An ability to augment views with other data sources such as location, inertial movements, eye movements, etc., thereby giving audience members an improved personal experience of their favorite players;

An ability to create richness and variety of dynamic views in an algorithmic manner (e.g., POV of whichever player has the ball, POV of defensive player closest to ball, etc.);

Providing visibility into audience likes and dislikes of different views within the field of play to give improved feedback to the content providers; and An ability to enhance existing broadcast TV model with alternative views on second screen technologies such as iPads and smart phones, etc.

IX. CLAIMS

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The invention claimed is:

1. A method comprising:
  requesting point of view content for a sporting event employing at least one content capturing device within a venue;
  identifying processing rules associated with the requested point of view content;
  accessing data from the at least one content capturing device within the venue based on the identified processing rules;
  processing the accessed data from the at least one content capturing device within the venue;
  generating the point of view content from the processed data from the at least one content capturing device within the venue;
  transmitting the point of view content, the point of view content being comprised of content combined from the at least one content capturing device within the venue; and
  manipulating point of view content.

2. The method of claim 1, wherein requesting point of view content comprises requesting point of view content limited by at least one of the following: type of user, license of the user, and location of the user.

3. The method of claim 1, wherein manipulating the point of view content comprises at least one of the following:
   storing content,
   filtering data, and
   generating computer generated imagery (CGI) content.

4. The method of claim 3, wherein generating the CGI content comprises generating a three-dimensional rendering based on the content.

5. The method of claim 1, wherein manipulating the point of view content comprises selecting for presentation at least one of the following:
   a processed feed,
   a feed from a microphone, and
   a CGI generation.

6. A method comprising:
   requesting point of view content for a sporting event employing content capturing devices within a venue, the point of view content comprising Computer Generated Imagery (CGI) content based on data from at least one content capturing device, of the content capturing devices;
   identifying processing rules associated with the requested point of view content comprising CGI content;
   accessing data from the at least one content capturing device within the venue based on the identified processing rules;
   processing the accessed data from the content capturing devices within the venue;
   determining requirements associated with the CGI content;
   generating the CGI content and the point of view content from the processed data;
   transmitting the point of view content, the point of view content being comprised of the CGI content combined from the at least one content capturing device within the venue; and
   manipulating point of view content, wherein manipulating the point of view content comprises manipulating the CGI content based on the data from the at least one content capturing device.

7. The method of claim 6, wherein requesting the point of view content comprises requesting the point of view content limited by at least one of the following: type of user, license of the user, and location of the user.

8. The method of claim 6, wherein manipulating the point of view content comprises at least one of the following:
   storing content,
   filtering data, and
   generating additional computer generated imagery (CGI) content.

9. The method of claim 8, wherein generating the additional CGI content comprises updating the CGI content based on additional processing rules associated with the point of view content.

10. The method of claim 6, wherein manipulating the point of view content comprises selecting for presentation at least one of the following:
    a processed feed,
    a feed from a microphone, and
    a CGI generation.

11. The method of claim 8, wherein generating the additional CGI content comprises processing metadata from the at least one content capturing device.

12. The method of claim 11, wherein processing the metadata captured from the at least one content capturing device comprises timestamps, location data, inertia data, and triangulation data.

13. The method of claim 12, wherein the processing metadata captured from telemetry data streams comprises processing metadata from the at least one content capturing device.

14. The method of claim 11, wherein processing the metadata captured from audio data comprises processing metadata associated with captured audio data.

15. The method of claim 6, further comprises generating a three-dimensional rendering from within video frames of the capturing devices.

* * * * *